United States Patent [19]

Muchow

[11] 4,116,215
[45] Sep. 26, 1978

[54] AUTOMATIC RESET PILOT VALVE

[75] Inventor: John D. Muchow, Cerritos, Calif.

[73] Assignee: Willis Oil Tool Co., Long Beach, Calif.

[21] Appl. No.: 772,906

[22] Filed: Feb. 28, 1977

Related U.S. Application Data

[63] Continuation of Ser. No. 617,386, Sep. 29, 1975, abandoned.

[51] Int. Cl.² .............................................. F16K 11/10
[52] U.S. Cl. ............................. 137/596.18; 137/458; 137/596.1
[58] Field of Search .................. 137/458, 596.1, 596.18

[56] References Cited

U.S. PATENT DOCUMENTS 4,017,053  4/1977  Wells et al. .................... 137/458 X Primary Examiner—Gerald A. Michalsky
Attorney, Agent, or Firm—Paul A. Weilein

[57] ABSTRACT

The valve spool of a three-way pilot valve responds to changes in pressure in a pipeline downstream from a shut-off valve that is biased to close by spring pressure and has a control cylinder to admit pressurized control fluid to open in opposition to the spring pressure. When the pipeline pressure is in the normal range the valve spool is at a normal position where it places the pressurized control fluid in communication with the control cylinder of the shut-off valve to keep the shut-off valve open. When the pipeline pressure drops below the normal range the valve spool moves in one direction from its normal position to a first alternate position to cause the shut-off valve to close and when the pipeline pressure rises above the normal range the valve spool moves in the opposite direction to a second alternate position to cause the shut-off valve to close. At each of the two alternate positions of the valve spool, it cuts off the source of pressurized fluid and at the same time vents the control cylinder of the shut-off valve to close the shut-off valve. When the pipeline pressure returns to the normal pressure range, the valve spool returns automatically to its normal position to open the shut-off valve.

6 Claims, 6 Drawing Figures

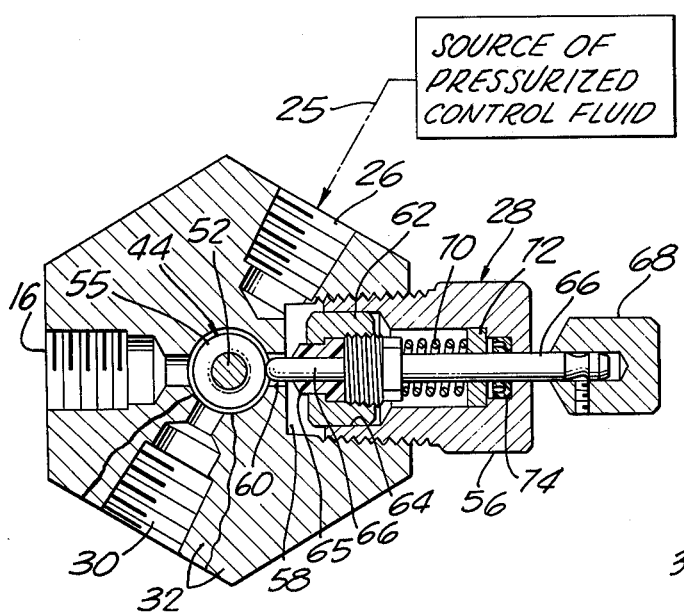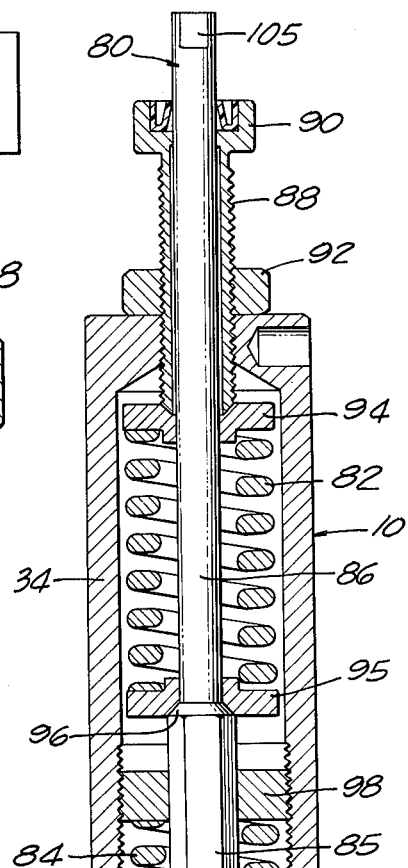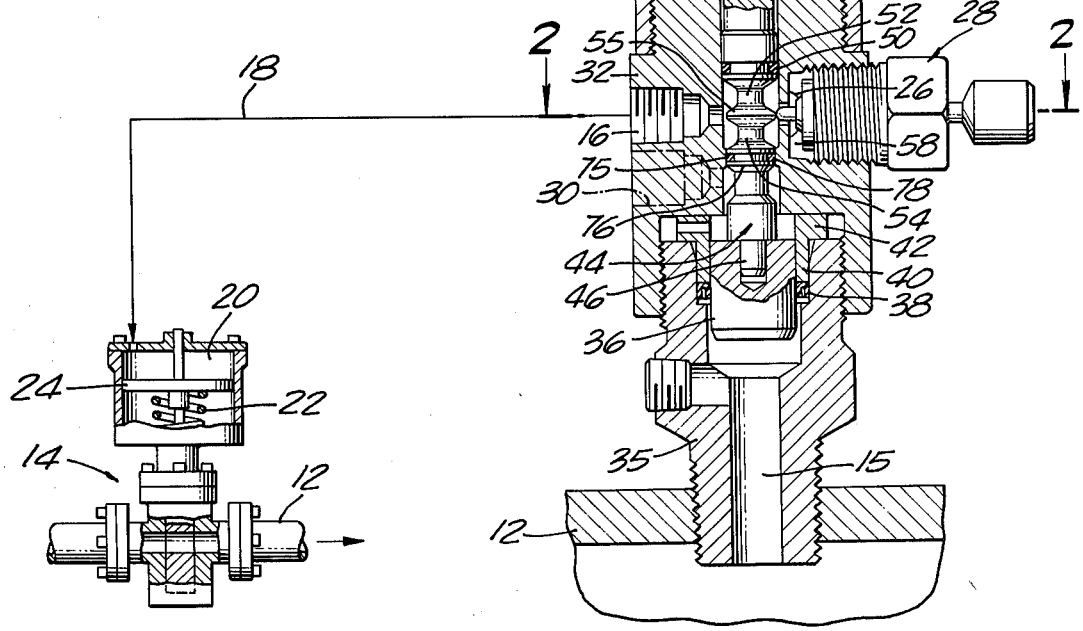

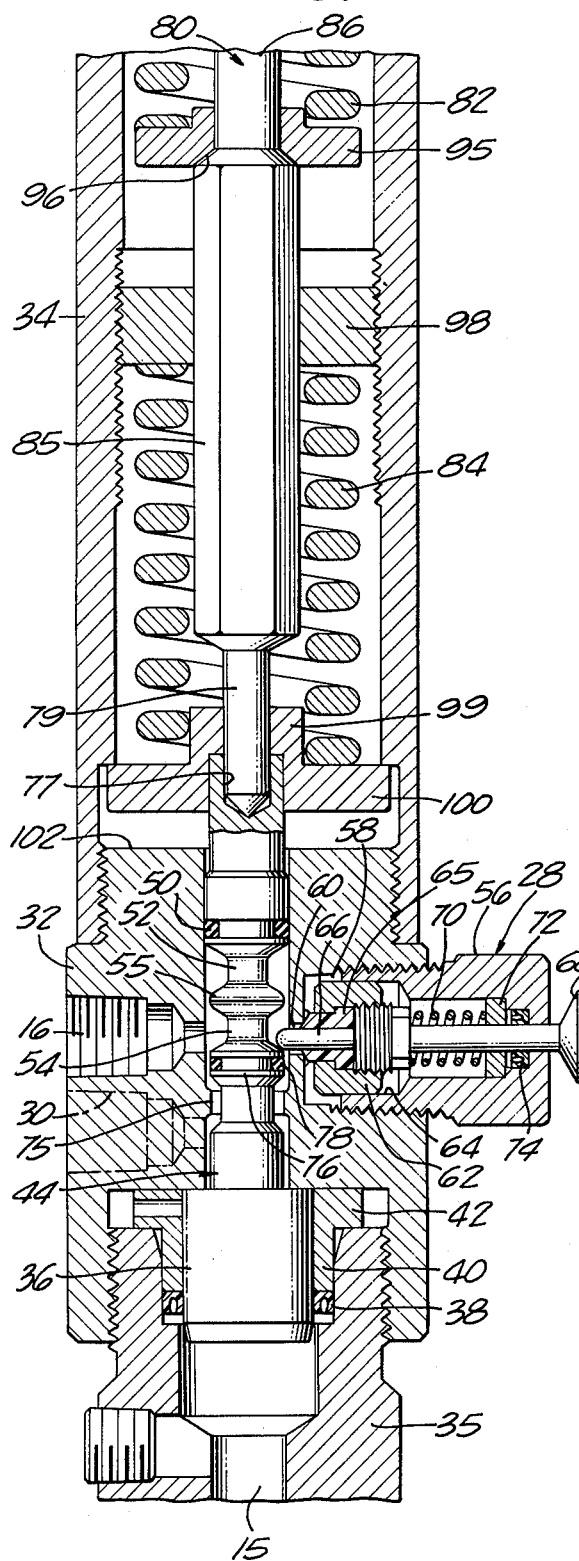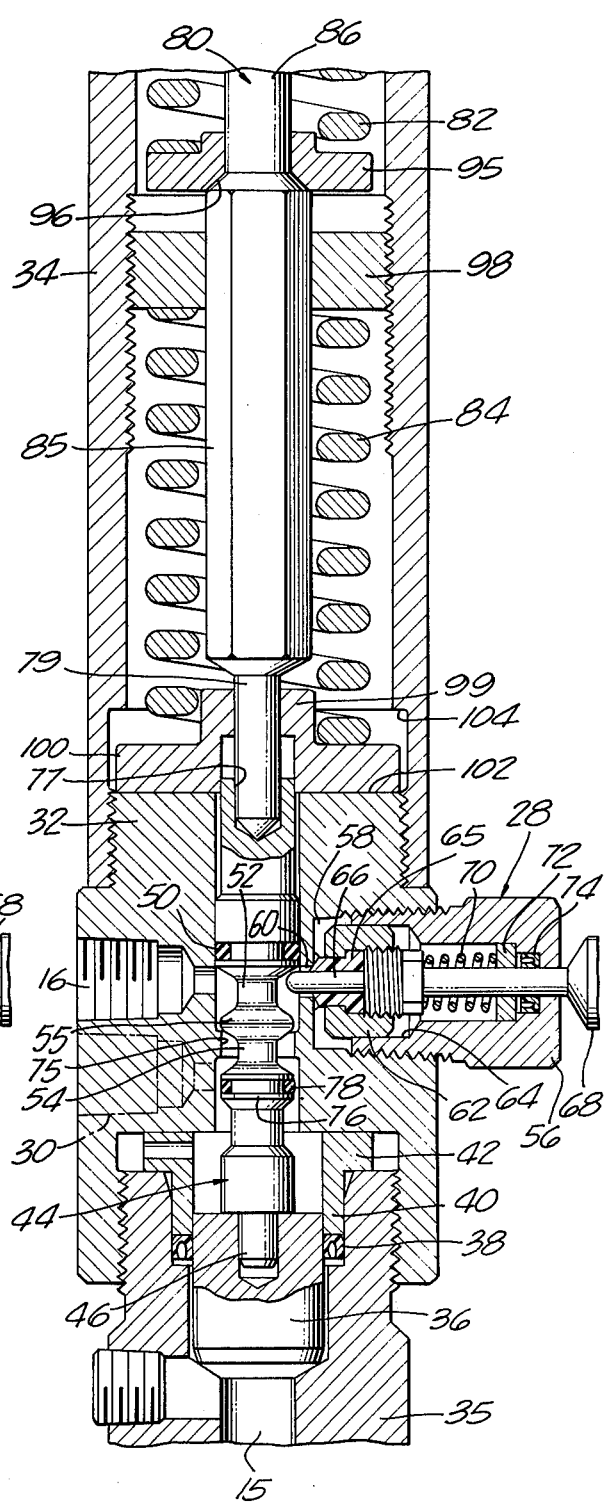

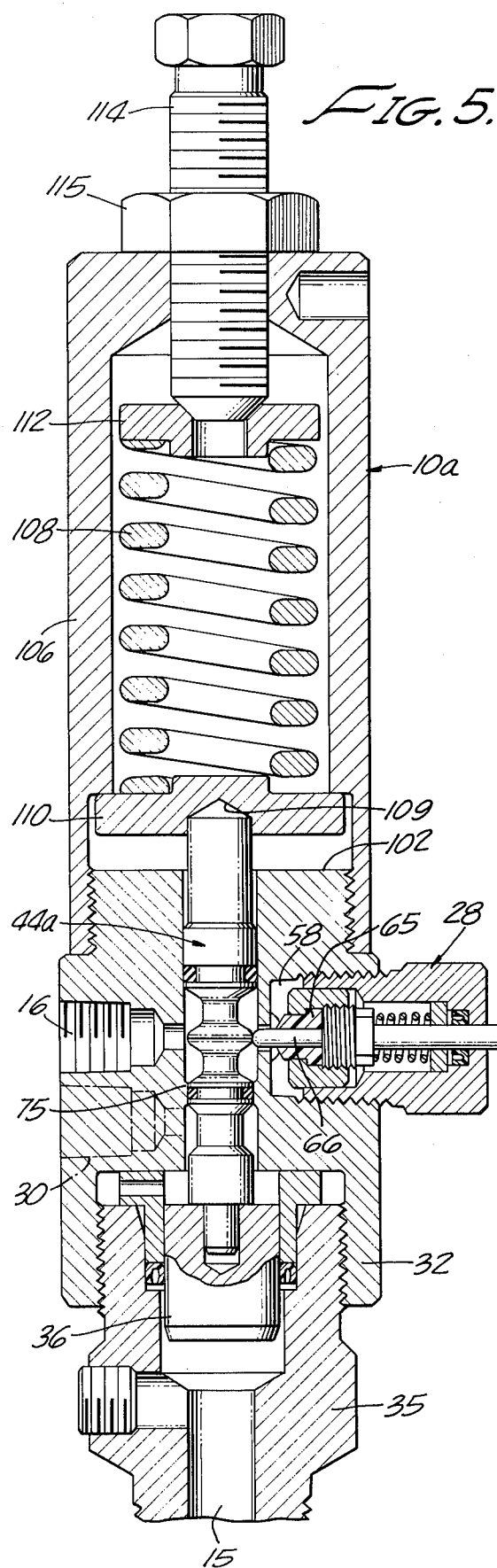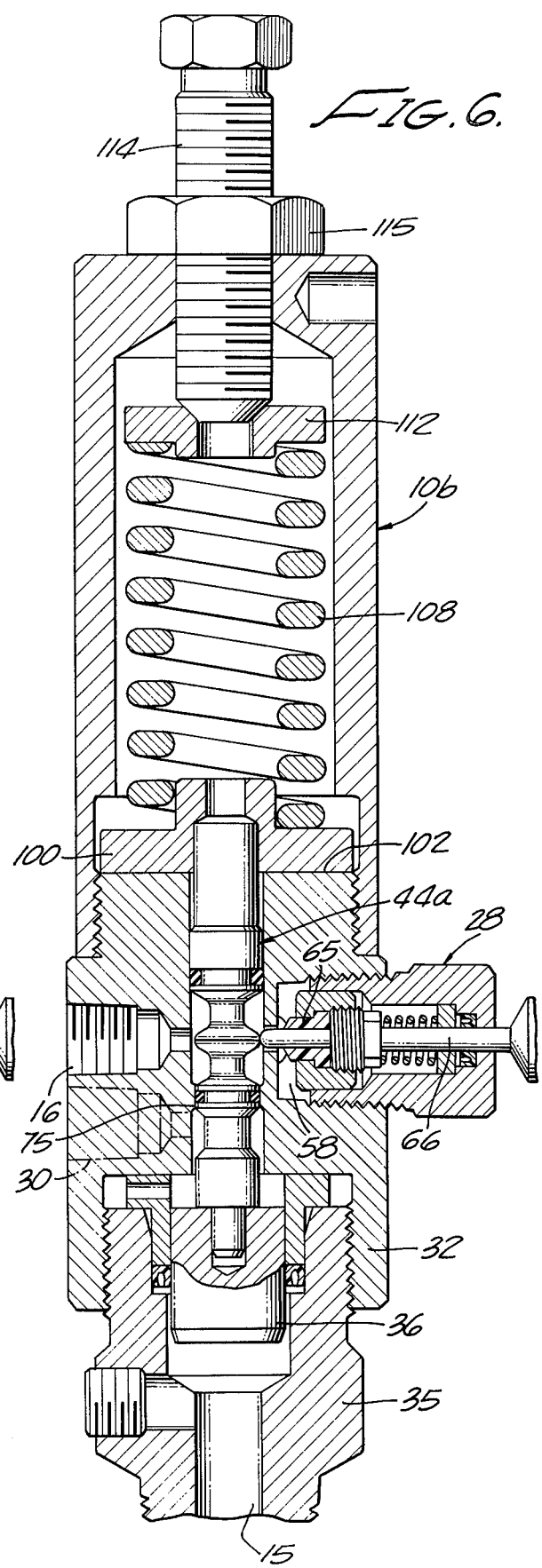

AUTOMATIC RESET PILOT VALVE

This is a continuation, of application Ser. No. 617,386, filed Sept. 29, 1975, now abandoned.

BACKGROUND OF THE INVENTION

The present invention relates to a monitoring system for regulating a pressurized pipeline wherein a pilot valve senses departures of the pipeline pressure from a normal range and responds by closing a shut-off valve in the pipeline and wherein the pilot valve subsequently resets itself automatically when the pipeline pressure returns to normal.

By way of specific example, such a monitoring system may be used to open and close a shut-off valve in a high pressure natural gas distribution line in response to changes in demand downstream from the shut-off valve. The shut-off valve is spring biased to close and has a control cylinder into which pressurized control fluid may be introduced to open the shut-off valve. Pilot means senses changes in the pipeline pressure downstream from the shut-off valve and vents the control cylinder of the shut-off valve to close the shut-off valve when the pipeline pressure rises to a predetermined magnitude and subsequently admits control fluid to the control cylinder of the shut-off valve to open the shut-off valve when the pipeline pressure drops below the predetermined magnitude.

During the daytime, when the demand for natural gas is low, the pressure downstream from the shut-off valve stays high enough to keep the shut-off valve closed. As evening approaches, the demand for natural gas increases with subsequent decay of the pipeline pressure and the pilot means responds by opening the shut-off valve. Later the demand for natural gas decreases with consequent increase in the pipeline pressure to cause the shut-off valve to be again closed.

Such a regulating monitoring system is to be distinguished from a safety monitoring system wherein a monitor pilot cooperates with an actuator pilot to close a shut-off valve in a pipeline in an emergency, for example, when a dangerously high pressure surge occurs in the pipeline or when rupture of the pipeline downstream from the shut-off valve causes the pipeline pressure to drop. After the cause of such an emergency is corrected, the actuator pilot of the control system must be reset by hand to restore the pipeline to service. Thus, the safety monitoring system forces responsible personnel to take note of an emergency. It is apparent that automatic resetting of the actuator pilot would defeat the purpose of a safety monitoring system.

SUMMARY OF THE INVENTION

It is an object of the invention to provide a single pilot valve that combines the functions of an actuator pilot valve and a monitor pilot valve and thus make possible a regulatory monitoring system that employs a single pilot valve. For this purpose the single pilot valve is a three-way pilot valve that senses undue changes in the pipeline pressure and is directly connected to the control cylinder of the shut-off valve to supply pressurized control fluid to the control cylinder to hold the shut-off valve open when the pipeline pressure is in the normal range and to close the shut-off valve by venting the control cylinder of the shut-off valve when the pipeline pressure departs from the normal range.

Another object of the invention is to provide such a single pilot valve that automatically resets in response to restoration of normal pressure in the pipeline. The pilot valve has a valve spool which responds to changes in the pipeline pressure by taking a normal position when the pipeline pressure is normal and taking an alternate position when the pipeline pressure departs from the normal pressure range. The pilot valve may be designed to cause the valve spool to seek its alternate position when the pipeline pressure rises above normal or it may be designed to cause the valve spool to seek its alternate position when the pipeline pressure drops below the normal pressure range.

In the preferred practice of the invention the pilot valve responds to both undue pressure rises in the pipeline and undue pressure drops. From its normal position the valve spool shifts in one direction to one alternate position in response to an undue drop in the pipeline pressure and shifts from its normal position in the opposite direction to its second alternate position in response to undue rise of the pipeline pressure.

The valve spool controls three ports of the pilot valve, namely, a supply port that receives the pressurized control fluid, a cylinder port that is connected to the control cylinder of the shut-off valve, and an exhaust port that is open to the atmosphere. Associated with the supply port is a poppet valve that is spring biased to cut off the supply port. At the normal position of the valve spool with the pipeline pressure in its normal range, the valve spool cams open the poppet valve to permit control fluid to flow from the supply port to the cylinder port to hold open the shut-off valve and at the same time the valve spool cuts off the exhaust port. When the valve spool moves to an alternate position in response to an undue change in the pipeline pressure, the valve spool permits the poppet valve to close and thereby cut off the supply port and at the same time the valve spool places the cylinder port in communication with the exhaust port to vent the control cylinder of the shut-off valve to cause the shut-off valve to close.

The valve chamber in which the valve spool reciprocates is formed with a restriction that is located between the cylinder port and the exhaust port and an enlargement of the valve spool registers with the restriction to cut off the cylinder port from the exhaust port at the normal position of the valve spool. Thus, the valve spool at its normal position both places the supply port in communication with the cylinder port by cam action and cooperates with the valve chamber restriction to cut off the cylinder port from the exhaust port. When the valve spool moves in either direction from its normal position to an alternate position, the valve spool enlargement moves away from the restriction of the valve chamber to place the cylinder port in communication with the exhaust port and simultaneously the cam portion of the valve spool permits the spring biased poppet valve to close to cut off the supply port.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a longitudinal sectional view of the pilot valve showing diagrammatically how the pilot valve is connected to the control cylinder of a shut-off valve;

FIG. 2 is an enlarged cross section along the line 2—2 of FIG. 1 showing how the ports of the pilot valve are arranged;

FIG. 3 is a fragmentary enlarged sectional view of the pilot valve showing the valve spool shifted in one direction from the normal position shown in FIG. 1 to an alternate position when the pipeline pressure rises above the normal range;

FIG. 4 is a similar view showing the valve spool displaced in the opposite direction from the normal position shown in FIG. 1 to a second alternate position when the pressure in the pipeline drops below the normal pressure range;

FIG. 5 is a longitudinal sectional view of a pilot valve that is designed to close the shut-off valve only when the pipeline pressure drops below its normal range; and FIG. 6 is a similar view of a pilot valve designed to close the shut-off valve only when the pipeline pressure rises above the normal range.

DESCRIPTION OF THE SELECTED EMBODIMENTS OF THE INVENTION

The first embodiment of the invention shown in FIGS. 1-4 is designed to close the shut-off valve either when the pressure in the pipeline rises above a normal range or when the pressure in the pipeline drops below the normal range.

FIG. 1 shows how the pilot valve, generally designated by numeral 10, is mounted on a pipeline 12 downstream from a shut-off valve 14 in the pipeline with a sensing port 15 of the pilot valve exposed to the downstream pressure in the pipeline. As shown diagrammatically in FIG. 1, the pilot valve has a cylinder port 16 which is connected by a line 18 to the control cylinder 20 of the shut-off valve 14 to deliver pressurized control fluid to the control cylinder to keep the shut-off valve open when the pipeline pressure is in the normal range. When the control cylinder 20 is vented to release the control fluid a spring 22 acting on a piston 24 closes the shut-off valve.

As shown diagrammatically in FIG. 2, a source of pressurized control fluid is connected by a line 25 to a supply port 26 of the pilot valve. Communication between the supply port 26 and the region of the cylinder port 16 is controlled by a spring biased means in the form of a poppet valve 28. As indicated in FIGS. 1 and 2, the pilot valve has an exhaust port 30 which is open to the atmosphere and which is spaced substantially below the cylinder port 16.

The monitor pilot has a body comprising a basic body section 32, an upwardly extending spring housing 34 and a lower nipple fitting 35 which forms the sensing port 15 and screws into the pipeline 12. The axial passage of the nipple fitting 35 is of stepped configuration to enclose a piston 36 that senses changes in pressure in the pipeline 12. The piston 36 is sealed by a sealing ring 38 which is confined by a guide bushing 40 and the guide bushing has a flange 42 that is confined between the basic body section 32 and the upper end of the nipple fitting 35.

A valve spool, generally designated 44, is slidingly mounted in a valve chamber of the pilot valve 10 and is controlled by the piston 36. In the construction shown the valve spool has a reduced end 46 which seats in a blind bore of the piston. The valve spool is embraced by an O-ring 50 to prevent leakage of fluid into the spring housing 34. The valve spool has an upper circumferential groove 52 and a lower circumferential groove 54 which together form a cam enlargement 55 to control the poppet valve 28.

As shown in FIG. 2 the poppet valve 28 has a body 56 which threads into the basic body section 32 of the pilot valve. The poppet valve has a valve chamber 58 which is in constant communication with the supply port 26 and a short bore 60 extends from the valve chamber 58 into the valve chamber that houses the valve spool. The poppet valve has a head 62 of circular configuration which is slidingly mounted in a guide bore 64 of the poppet valve body 56 and the valve head carries a nose 65 of rubber-like material to cooperate with the short bore 60. The poppet valve has a stem 66 the inner end of which extends into the short bore 60 and the outer end of which carries a nob 68 by means of which the poppet valve may be manually opened against resistance of a coiled spring 70. The coiled spring 70 acts under compression against the valve head 62 and backs against a suitable washer 72. A suitable sealing ring 74 surrounds the valve stem 66 to prevent leakage to the exterior.

At the closed position of the poppet valve nose 65 shown in FIGS. 3 and 4, the nose 65 of the poppet valve seats against the outer end of the bore 60 to cut off the supply port 26 from the valve chamber of the pilot valve that encloses the valve spool. At this time the inner end of the valve stem 66 extends into the region of one of the two circumferential grooves 52 and 54 of the valve spool. When the valve spool is in its normal position shown in FIG. 1 with the pressure in the pipeline 12 within its normal range, the cam enlargement 55 of the valve spool retracts the valve stem 66 by cam action to place the supply port 26 in communication with the valve chamber that houses the valve spool 44. Thus, the inner end of the valve stem serves as a follower controlled by the cam enlargement 55 of the valve spool.

The valve chamber of the pilot valve in which the valve spool 44 reciprocates has a restriction in the form of a land 75 and the valve spool has an enlargement 76 equipped with a sealing ring 78 for cooperation with the land 75. As shown in FIG. 1 the cylinder port 16 is on one side of the land 75 and the exhaust port 30 is on the other side of the land.

It is to be noted in FIG. 1 that, when the cam enlargement 55 of the valve spool is in its normal position to hold the poppet valve 28 open, the enlargement 76 of the valve spool registers with the land 75 to cut off the exhaust port 30 from the cylinder port 16. At this time the pressurized control fluid from the supply port 26 is in communication with the cylinder port 16 and the connected line 18 to keep the shut-off valve 14 open. On the other hand, when the cam enlargement 55 of the valve spool is shifted away from the valve stem of the poppet valve 28, the poppet valve will be closed by the spring 70 and the enlargement 76 of the valve spool moved out of register with the land 75 to permit free communication between the cylinder port 16 and the exhaust port 30.

If the cam enlargement 55 is shifted upward by an undue rise of pressure in the pipeline 12 as shown in FIG. 3, the enlargement 76 of the valve spool will be shifted upward away from the land 75 to permit fluid flow from the cylinder port 16 past the land to the exhaust port 30. On the other hand, if the cam enlargement 55 of the valve spool is shifted downward as shown in FIG. 4 by an undue drop in the pipeline pressure, the enlargement 76 of the valve spool will drop below the land 75 to permit fluid flow from the cylinder port 16 to the exhaust port 30.

The upper end of the valve spool 44 has a blind axial bore 77 to seat a lower reduced end 79 of an axial rod, generally designated 80, that is surrounded both by a low pressure spring 82 and a high pressure spring 84. The axial rod 80 has a lower section 85 of hexagonal cross sectional configuration and an upper end section 86 of circular cross sectional configuration which slidingly extends through an elongated bushing 88 in the upper end wall of the spring housing 34. The elongated bushing 88 has a hexagonal head 90 and is embraced by a jam nut 92.

The low pressure spring 82 is compressed between a non-rotatable upper spring seat 94, engaged by the lower end of the bushing 88, and a lower spring seat 95 that abuts a tapered circumferential shoulder 96 of the axial rod 80 to apply downward force to the axial rod. The hexagonal section 85 of the axial rod 80 slidingly extends through a hexagonal opening of a spring seat 98 for the upper end of the high pressure spring 84. the spring seat 98 has an outer circumferential screw thread 20 mating with an internal screw thread of the spring housing 34 to permit axial adjustment of the position of the spring seat by rotation of the rod 80.

A lower spring seat 99 for the high pressure spring 84 is formed with a radial flange 100 which has room for movement between a radial surface 102 at the upper end of the basic body section 32 and an inner circumferential shoulder 104 of the spring housing 34. Normally, the lower spring seat 99 rests on the radial surface 102, as shown in FIG. 1.

When the pressure in the pipeline 12 is within a predetermined normal range of pressures, the valve spool 44 of the pilot valve 10 is in its normal position as shown in FIG. 1 to keep the poppet valve 28 open and to seal off exhaust port 30 from the cylinder port 16.

When the pressure in the pipeline 12 rises above the predetermined normal range of pressures, the consequent increase in the fluid pressure against the piston 36 causes the high pressure spring 84 and low pressure spring 82 to yield with consequent upward shift of the spring seat 99 and the axial rod 80, thereby to cause upward shift of the valve spool 44 from the normal position shown in FIG. 1 to the high pressure position shown in FIG. 3. The upward shift of the valve spool moves the valve spool enlargement 76 out of register with the land 75 to place the cylinder port 16 in communication with exhaust port 30 and at the same time the upward shift of the valve spool moves the cam enlargement 55 out of engagement with the stem of the poppet valve 28 to cause the poppet valve to close by spring action and thereby cut off the supply port 26 from the cylinder port 16.

To adjust the force exerted by the high pressure spring 84 against the spring seat 99, a wrench is applied to a pair of flats 105 on the exposed upper end of the axial rod 80 and the axial rod is rotated to cause corresponding rotation of the screw threaded spring seat 98. Counterclockwise rotation of the axial rod 80 decreases the force exerted by the high pressure spring 84 against the lower spring seat 99.

When the pressure in the pipeline 12 drops below the predetermined normal pressure range, the low pressure spring 82 acting on the spring seat 95 and the axial rod 80 overcomes the fluid pressure on the piston 36 and shifts the valve spool downward to its lower limit position shown in FIG. 4. Here again, as in FIG. 3, the poppet valve 28 is released by the cam enlargement 55 to cut off the supply port 26 from the cylinder port 16 and at the same time the enlargement 76 of the valve spool drops below the land 75 to place the cylinder port 16 in communication with exhaust port 30. Consequently, the control cylinder 20 of the shut-off valve 14 vents to the exhaust port 30 to cause the shut-off valve to be closed by the spring 22.

To adjust the pressure exerted by the low pressure spring 82, the jam nut 92 is loosened and the bushing 88 adjusted in an upward direction to lower the spring pressure or in a downward direction to increase the spring pressure. After such an adjustment has been made, the jam nut 92 is tightened. The pressure of the low pressure spring 82 is always adjusted before a change is made in the pressure of the high pressure spring 84.

It is apparent from the foregoing description that when the pilot valve 10 is in its normal state illustrated by FIG. 1 with the pressure in the pipeline 12 within the normal range, a rise of the pipeline pressure above the normal range causes the valve spool to rise to the position shown in FIG. 3 with consequent closing of the shut-off valve 14. In like manner, when the pressure in the pipeline drops below the normal range the valve spool shifts downward to the position shown in FIG. 4 to cause the shut-off valve 14 to close. In either event, the subsequent restoration of normal pressure in the pipeline 12 causes the pilot valve to reset itself automatically. That is to say, restoration of normal pressure in the pipeline causes the valve spool to return to its normal position shown in FIG. 1 to cut off the exhaust port 30 of the pilot valve from the control cylinder 20 of the shut-off valve and simultaneously to open the poppet valve 28 to deliver control fluid to the control cylinder 20 of the shut-off valve to cause the shut-off valve to open.

FIG. 5 shows how an automatic reset pilot valve generally designated 10a may be substituted for the pilot valve 10 of FIGS. 1–4 when it is required that the shut-off valve close only in response to drop in the line pressure below the normal operating range. The pilot valve 10a is in many respects identical with the previously described pilot valve 10, as indicated by the use of corresponding numerals to designate corresponding parts.

In FIG. 5, a spring housing 106 encloses a single pressure spring 108 which expands when the pressure in the pipeline 12 drops below a predetermined normal pressure range. The upper end of the valve spool 44a of the pilot valve is seated in a recess 109 in a spring seat 110 for the lower end of the spring 108. The upper end of the spring 108 backs against a spring seat 112 that, in turn, backs against the inner end of an adjustment screw 114 that carries a jam nut 115.

FIG. 5 shows the state of the pilot valve 10a when the pressure in the pipeline 12 is in the normal range. At that time the spring seat 110 is spaced above the radial surface 102 with sufficient clearance to permit the valve seat to shift the valve spool of the pilot valve 10a downward to the position shown in FIG. 4 when the line pressure drops below the normal range. In that event, subsequent restoration of the normal pipeline pressure causes the pilot valve to reset itself automatically by returning the valve spool to the normal position shown in FIG. 5.

FIG. 6 shows an automatic reset pilot valve, generally designated 10b, that may be substituted for the pilot valve 10 of FIGS. 1–4 when it is required that the shut-off valve 14 close only in the event that the pressure in the pipeline 12 rises above a normal pressure range. The construction shown in FIG. 6 is the same as the construction shown in FIG. 5 except that a spring seat 100 is substituted for the spring seat 110.

Since the spring 108 is strong enough to withstand the normal pressure range in the pipeline, the spring normally holds the spring seat 100 against the radial surface 102 as shown in FIG. 6. When the pressure in the line rises above the normal range, however, it overcomes the spring 108 to lift the spring seat 100 away from the radial surface 102 with consequent shift of the valve spool of the pilot valve to the elevated position shown in FIG. 3 to cause the poppet valve 28 to close and to place the cylinder port 16 in communication with the exhaust port 30 to cause the shut-off valve 14 to close.

My description herein of the selected embodiments of the invention will suggest various changes, substitutions and other departures from my disclosure within the spirit and scope of the appended claims.

I claim:

1. A single pilot valve mechanism to control the transmission of control fluid from a pressurized source to a control cylinder of a spring-loaded shut-off valve in a pipeline in response to changes in the pipeline pressure, said pilot valve having in combination:

a valve body having a bore therein and four ports communicating with said bore, namely, a supply port for connection with the source of control fluid, a cylinder port for communication with the control cylinder of a shut-off valve, an exhaust port, and a sensing port for communication with the pipeline downstream from the shut-off valve;

a first valve member movable along said bore and responsive to changes in the pressure at the sensing port and having a normal position when the pressure in the pipeline is in a predetermined normal range;

first spring means effective to move the first valve member in one direction in said bore out of its normal position to a first alternate position in response to drop of pressure in the pipeline below said normal range;

second spring means effective to enable movement of the first valve member in the other direction in said bore out of its normal position to a second alternate position in response to rise in the pipeline pressure above said normal range;

a second valve member for controlling flow through said supply port;

said first valve member at its normal position being operable to actuate said second valve member to open position and placing said supply port in communication with the cylinder port to supply control fluid to the control cylinder of the shut-off valve to open the shut-off valve, and simultaneously cutting off the supply port from the exhaust port, said first valve member at each of its two alternate positions being operable to permit movement of said second valve member to closed position cutting off the supply port from the cylinder port, and simultaneously placing the cylinder port in communication with the exhaust port to vent the control cylinder of the shut-off valve to cause the shut-off valve to close, said first valve member at each of its two alternate positions being free to return automatically to its normal position in response to return of the pipeline pressure to the normal range.

2. A combination as set forth in claim 1, which includes spring means for biasing the second valve member to a closed position to cut off flow from the supply port to the cylinder port; and which includes means to open said second valve member in response to movement of the first valve member to its normal position.

3. A combination as set forth in claim 2 in which said second valve member has a retractable follower; and in which said first valve member has a cam portion to retract said cam follower at the normal position of the first valve member thereby to open the second valve member.

4. A combination as set forth in claim 1 in which said bore has a restriction between said cylinder port and said exhaust port; and in which said first valve member has an enlarged portion to register with said restriction at the normal position of the first valve member to cut off said exhaust port from the cylinder port, said enlargement of the first valve member being out of register with said restriction at each of the two alternate positions of the first valve member to permit flow from said cylinder port to said exhaust port.

5. A combination as set forth in claim 4 which includes spring means for biasing said second valve member to a closed position to cut off flow from the supply port to the cylinder port; and which includes means to open said second valve member in response to movement of the first valve member to its normal position.

6. A combination as set forth in claim 5 in which the means to open said second valve member includes a retractable follower; and in which said first valve member has a cam portion to retract said follower at the normal position of the first valve member thereby to connect said supply port to the cylinder port.

* * * * *

UNITED STATES PATENT AND TRADEMARK OFFICE
CERTIFICATE OF CORRECTION

PATENT NO. : 4,116,215
DATED : September 26, 1978
INVENTOR(S) : JOHN D. MUCHOW

It is certified that error appears in the above-identified patent and that said Letters Patent are hereby corrected as shown below:

Column 7, Claim 1, line 1, delete "single".

Signed and Sealed this

Twelfth Day of December 1978

[SEAL]

Attest:

RUTH C. MASON
Attesting Officer

DONALD W. BANNER
Commissioner of Patents and Trademarks